(12) United States Patent
Meaney et al.

(10) Patent No.: US 8,122,297 B2
(45) Date of Patent: Feb. 21, 2012

(54) METHOD AND APPARATUS FOR PARALLEL AND SERIAL DATA TRANSFER

(75) Inventors: Patrick J. Meaney, Poughkeepsie, NY (US); Ra'ed Mohammad Al-Omari, Valencia, CA (US); Michael Francis Fee, Cold Spring, NY (US); Pak-kin Mak, Poughkeepsie, NY (US); Scott Barnett Swaney, Catskill, NY (US)

(73) Assignee: International Business Machines Corporation, Armonk, NY (US)

( * ) Notice: Subject to any disclaimer, the term of this patent is extended or adjusted under 35 U.S.C. 154(b) by 1160 days.

(21) Appl. No.: 11/874,232

(22) Filed: Oct. 18, 2007

(65) Prior Publication Data
US 2009/0106588 A1 Apr. 23, 2009

(51) Int. Cl.
*G06F 11/00* (2006.01)
(52) U.S. Cl. .......................... 714/47.1; 714/25
(58) Field of Classification Search ............. 714/47
See application file for complete search history.

(56) References Cited

U.S. PATENT DOCUMENTS

| | | | | |
|---|---|---|---|---|
| 4,876,641 A * | 10/1989 | Cowley | 712/13 |
| 4,937,733 A * | 6/1990 | Gillett et al. | 710/108 |
| 5,331,315 A * | 7/1994 | Crosette | 712/28 |
| 5,412,788 A * | 5/1995 | Collins et al. | 711/157 |
| 5,418,970 A * | 5/1995 | Gifford | 712/20 |
| 5,590,284 A * | 12/1996 | Crosetto | 712/29 |
| 6,988,139 B1 * | 1/2006 | Jervis et al. | 709/226 |
| 7,355,987 B2 * | 4/2008 | Baumer | 370/258 |
| 7,397,859 B2 * | 7/2008 | McFarland | 375/260 |
| 7,849,362 B2 * | 12/2010 | Devins et al. | 714/25 |
| 2002/0006167 A1 * | 1/2002 | McFarland | 375/260 |
| 2006/0250985 A1 * | 11/2006 | Baumer | 370/258 |
| 2006/0259799 A1 * | 11/2006 | Melpignano et al. | 713/300 |
| 2007/0047589 A1 * | 3/2007 | Modaress-Razavi et al. | 370/503 |
| 2007/0168733 A1 * | 7/2007 | Devins et al. | 714/33 |
| 2008/0126911 A1 * | 5/2008 | Brittain et al. | 714/763 |
| 2008/0247415 A1 * | 10/2008 | Fields et al. | 370/463 |
| 2008/0307287 A1 * | 12/2008 | Crowell et al. | 714/758 |

* cited by examiner

*Primary Examiner* — Scott Baderman
*Assistant Examiner* — Kamini Patel
(74) *Attorney, Agent, or Firm* — Jon A. Gibbons; Fleit Gibbons Gutman Bongini & Bianco PL

(57) ABSTRACT

A method and apparatus are disclosed for performing maintenance operations in a system using address, data, and controls which are transported through the system, allowing for parallel and serial operations to co-exist without the parallel operations being slowed down by the serial ones. It also provides for use of common shifters, engines, and protocols as well as efficient conversion of ECC to parity and parity to ECC as needed in the system. The invention also provides for error detection and isolation, both locally and in the reported status. The invention provides for large maintenance address and data spaces (typically 64 bits address and 64 bits data per address supported).

20 Claims, 10 Drawing Sheets

FIG 1. Prior Art – Case 1
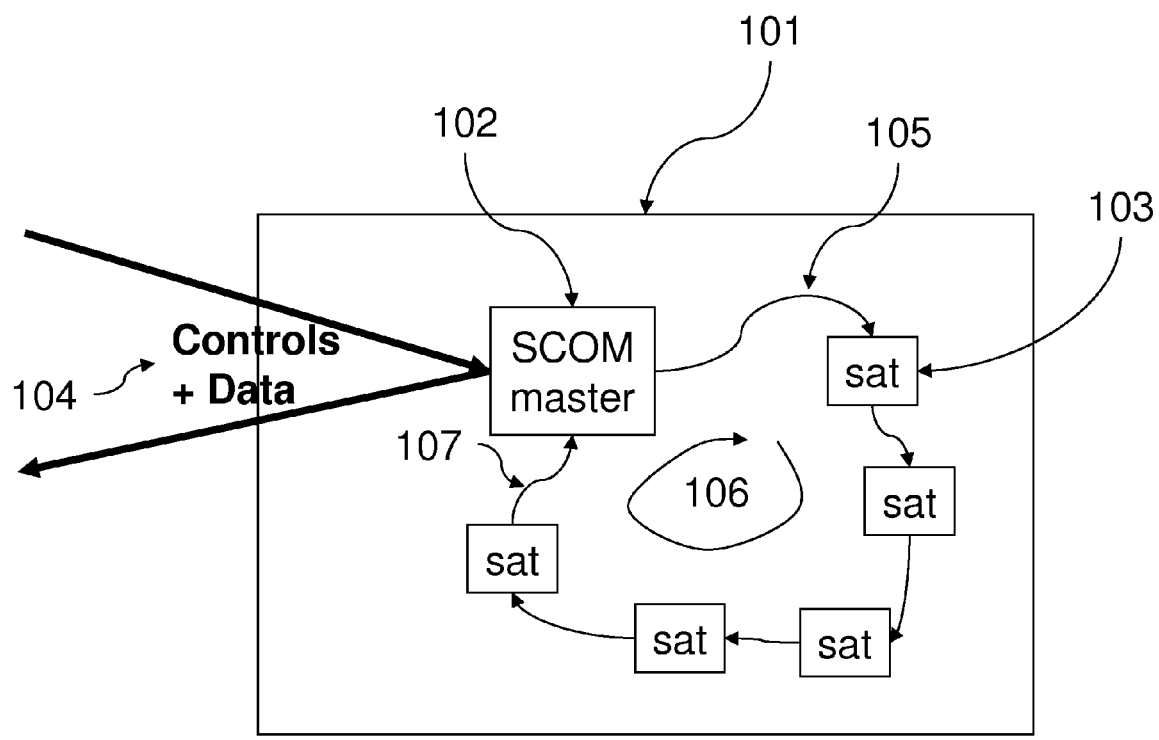

FIG 2. Prior Art – Case 2
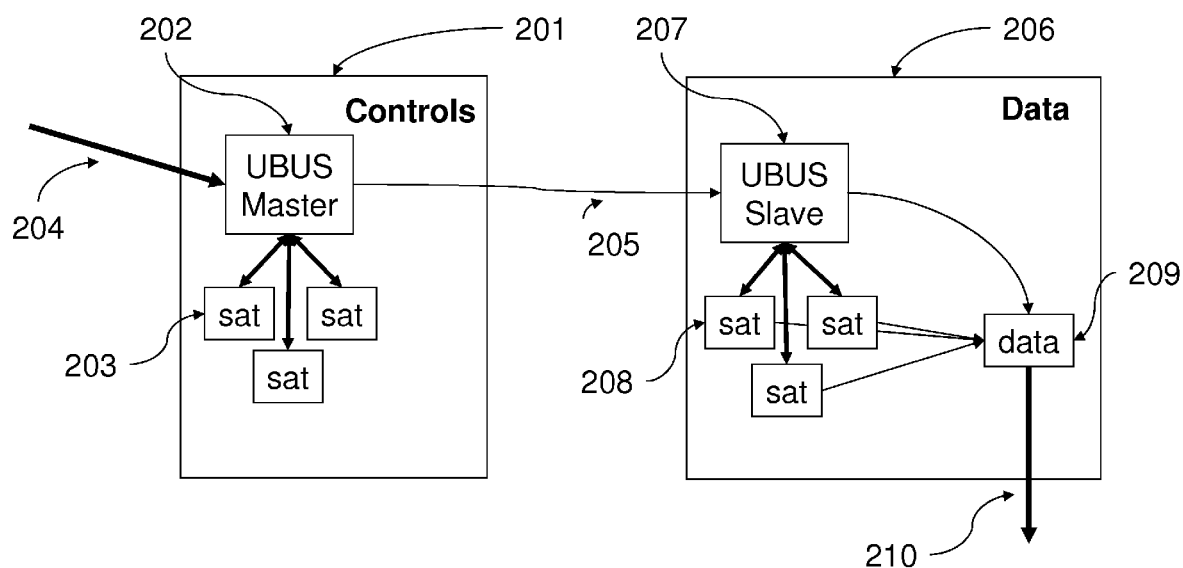

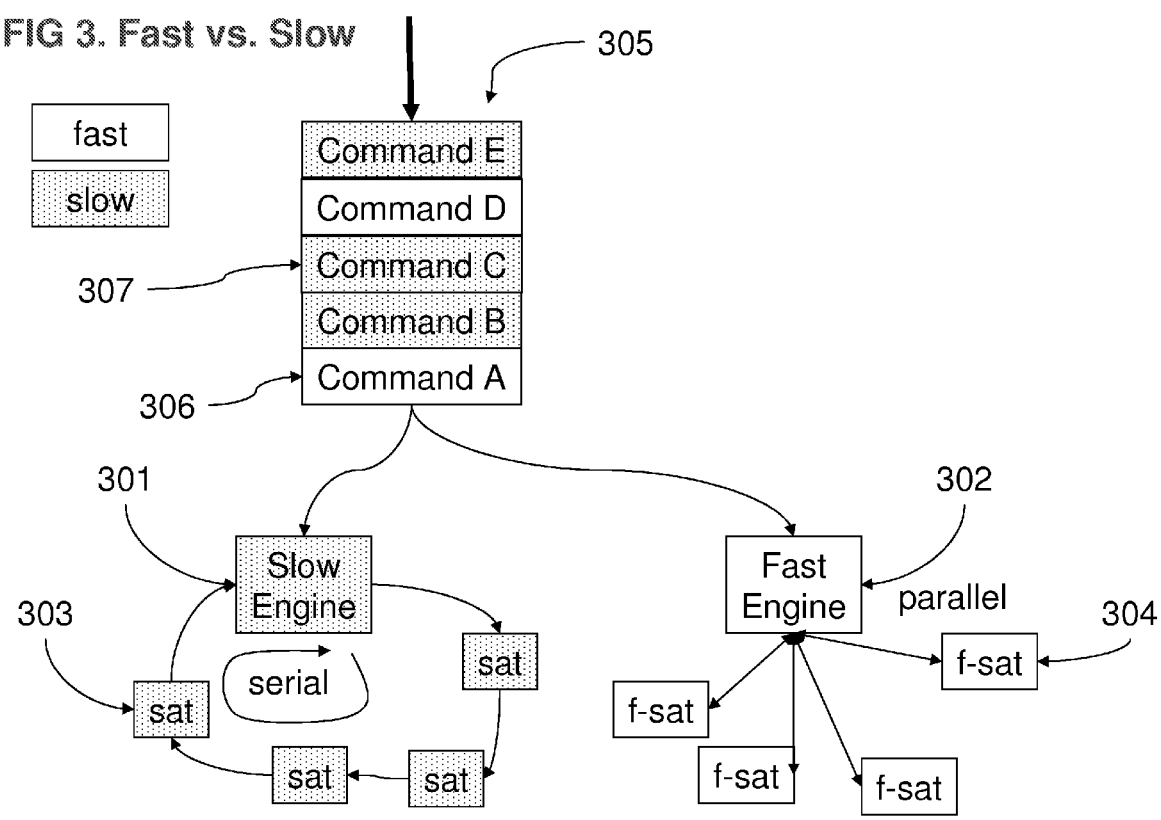

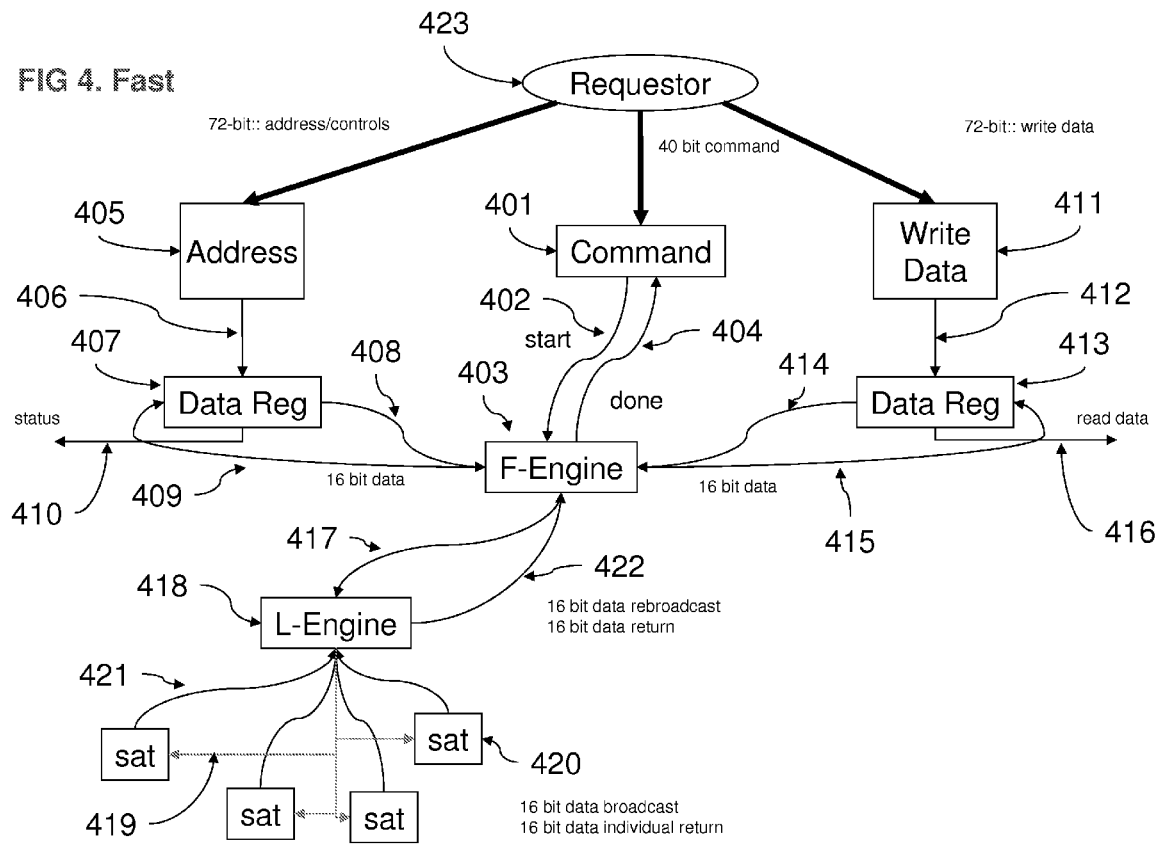

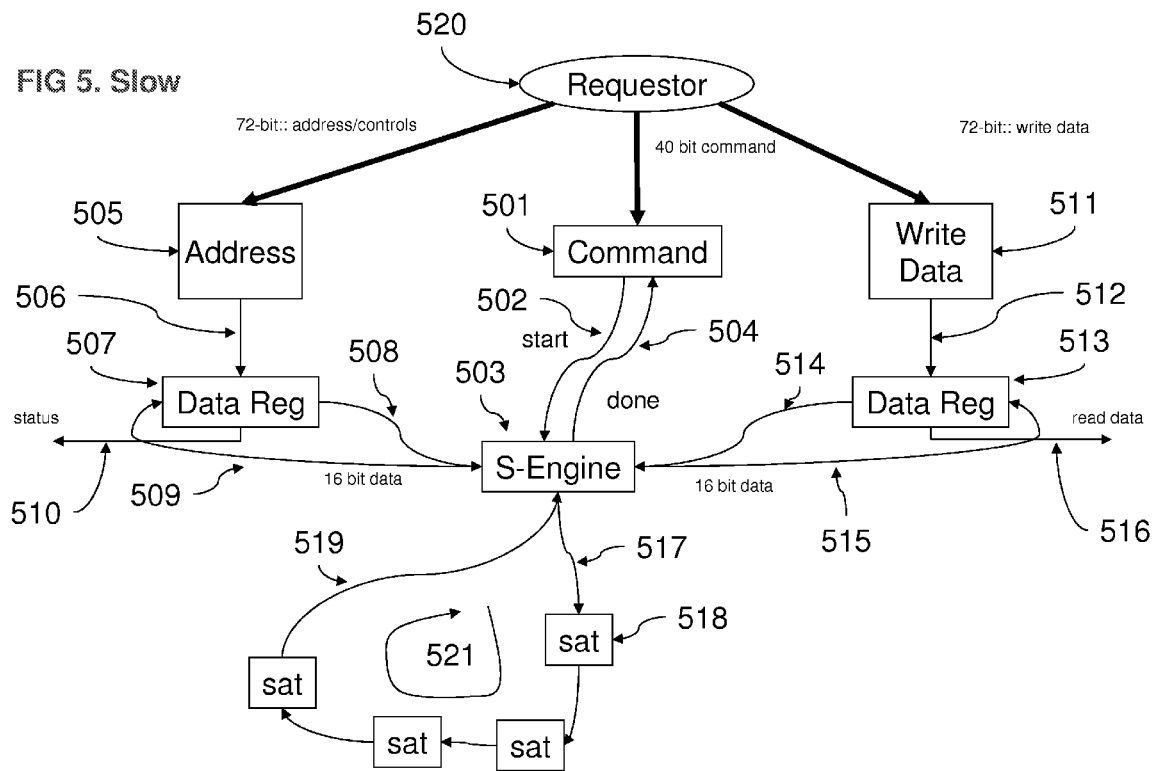
FIG 5. Slow

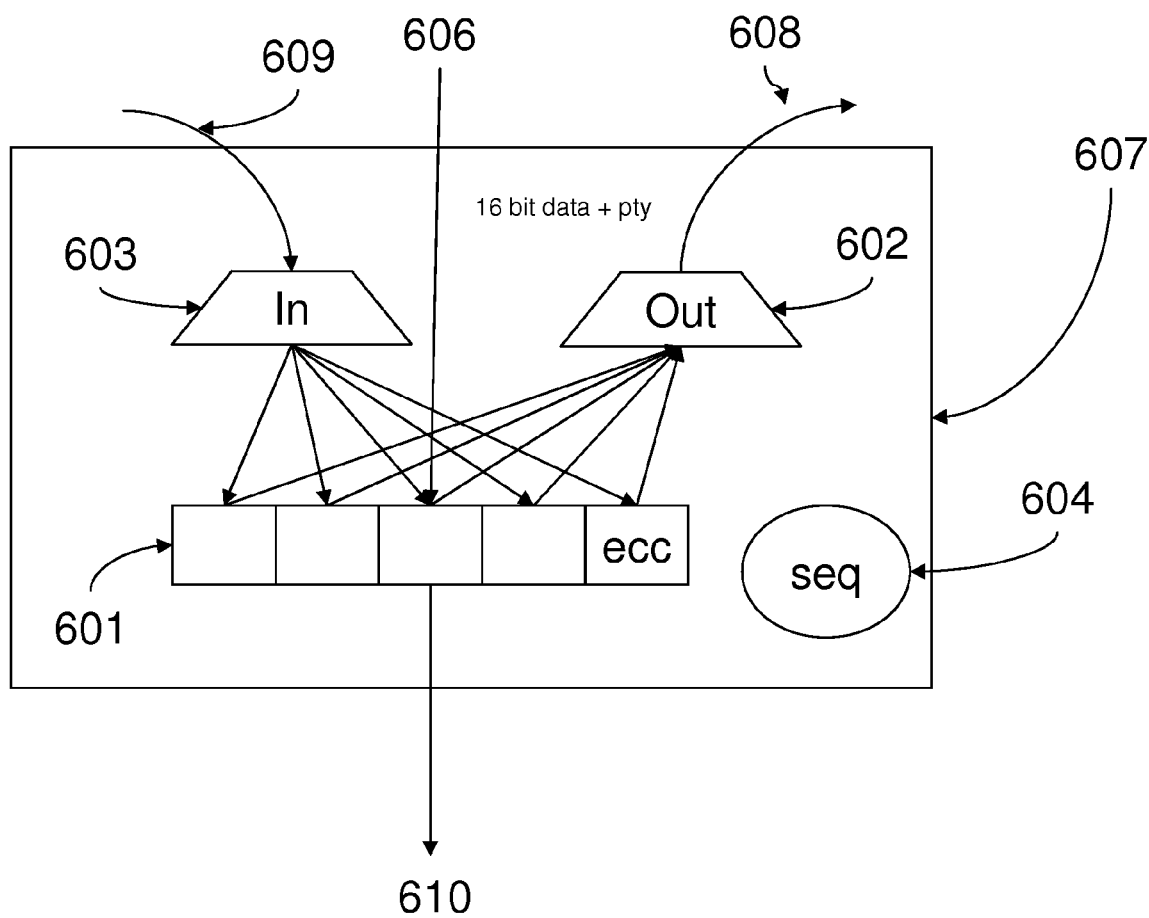
FIG 6. Shifting Data Reg

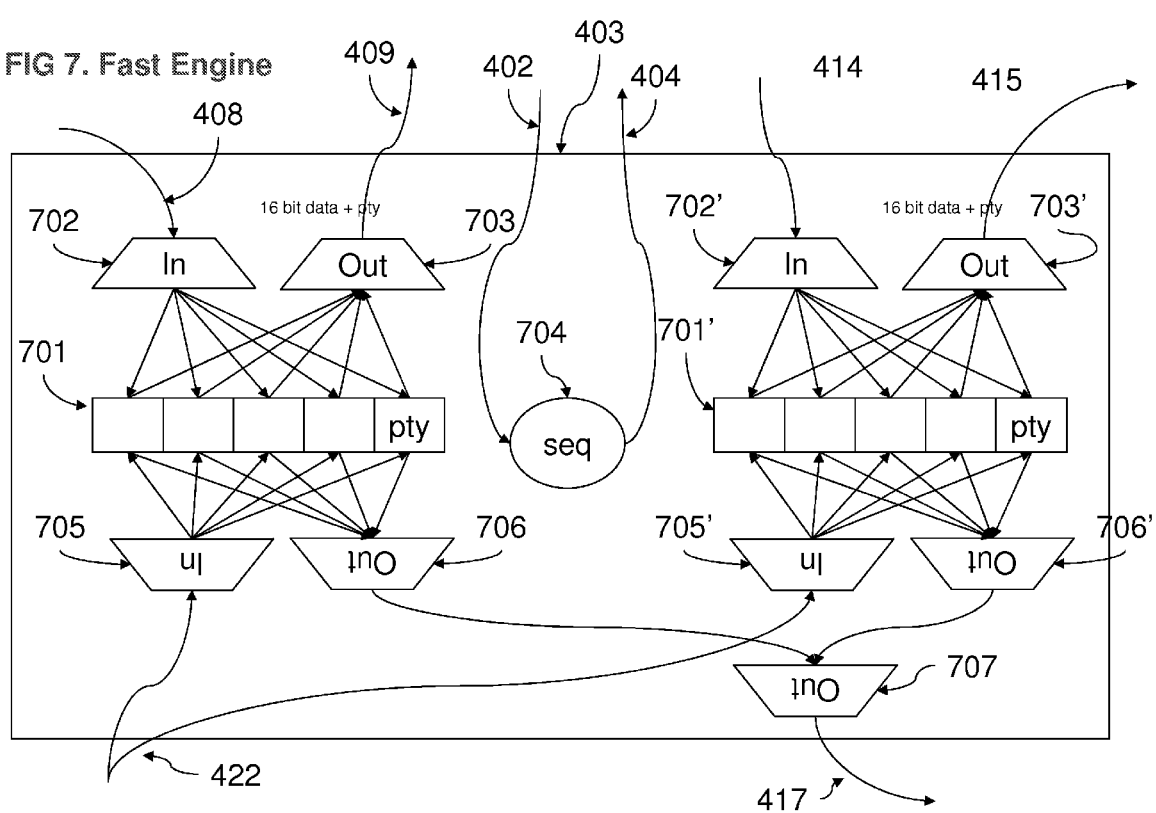

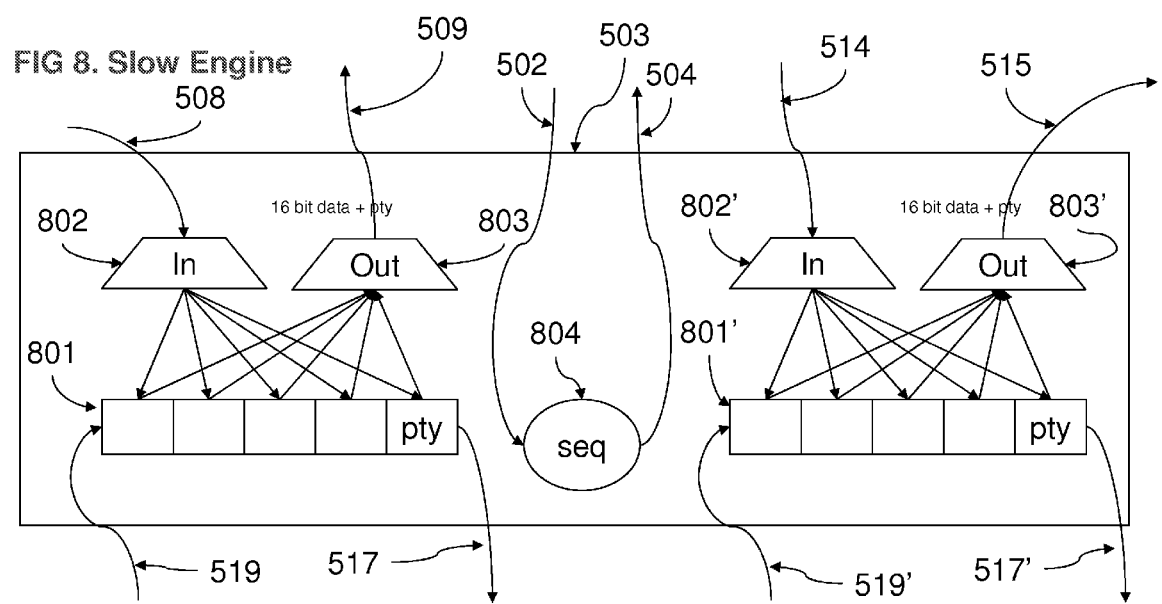

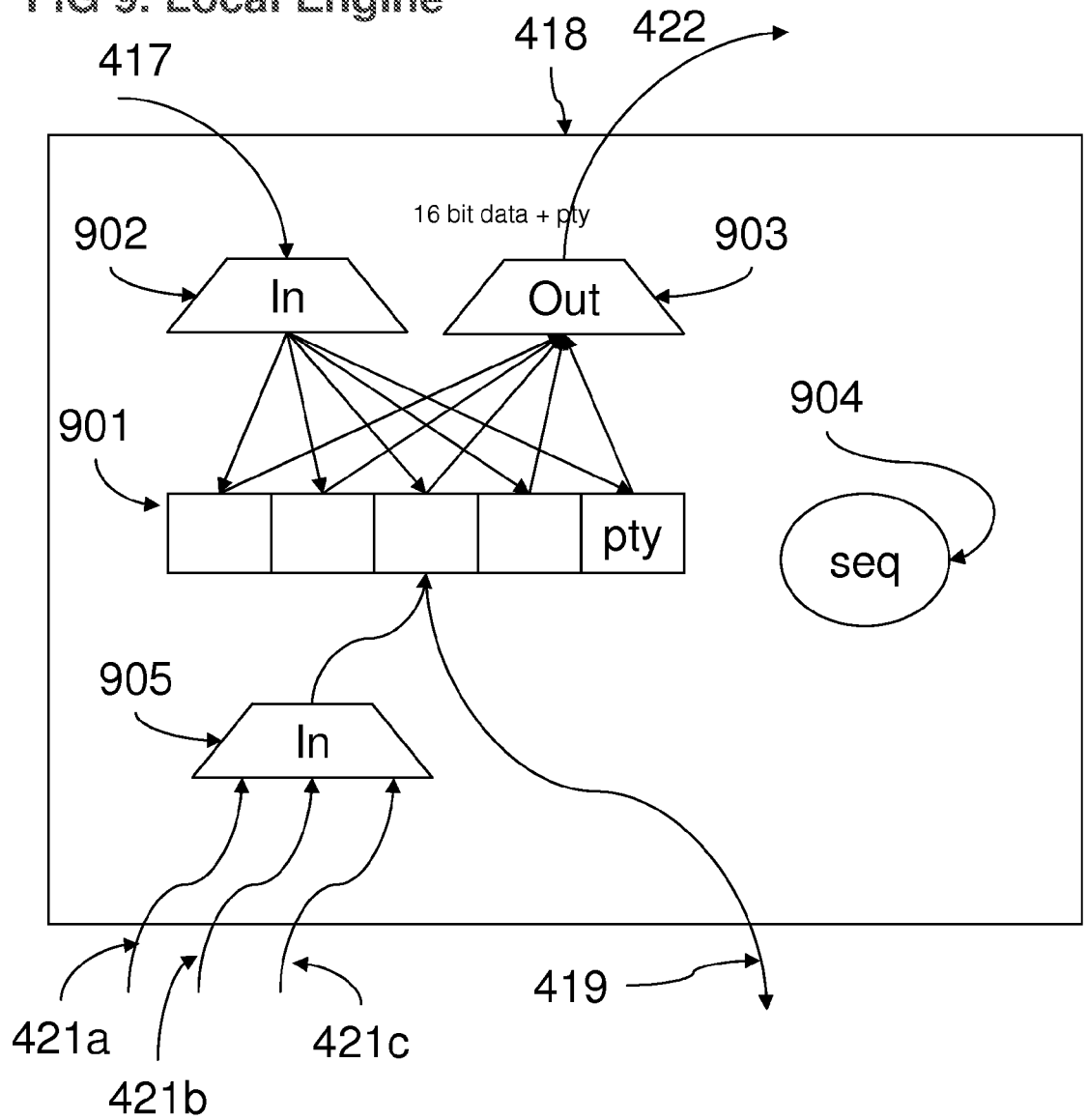
FIG 9. Local Engine

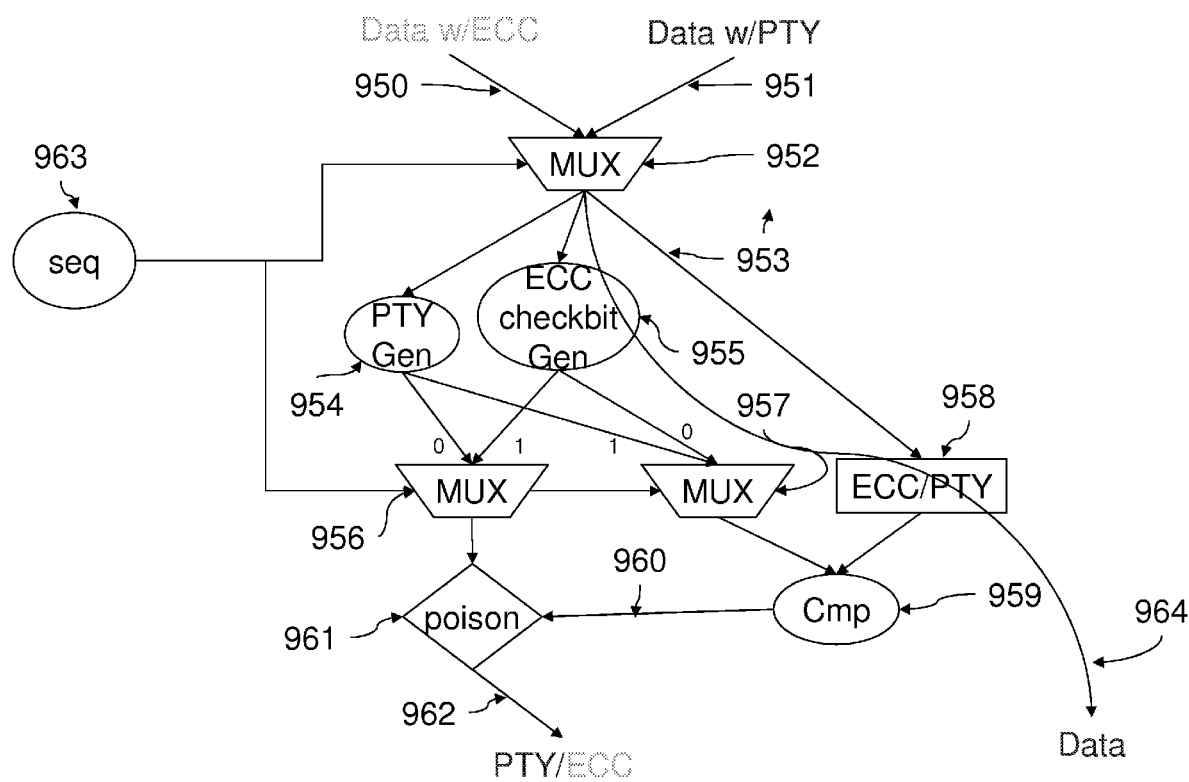
FIG 10. ECC/Parity conversion

METHOD AND APPARATUS FOR PARALLEL AND SERIAL DATA TRANSFER

CROSS-REFERENCE TO RELATED APPLICATIONS

Trademarks

IBM® is a registered trademark of International Business Machines Corporation, Armonk, N.Y., U.S.A. and other names used herein may be registered trademarks, trademarks or product names of International Business Machines Corporation or other companies.

BACKGROUND OF THE INVENTION

1. Field of the Invention

This invention relates to a method of transferring data in a computer system while optimizing wiring, latency, design re-use, RAS, and debugability with dual pipe and dual dataflow communication and controls for doublewords.

2. Description of Background

This invention relates to in-band computer system maintenance operations. In computers, particularly on High-end servers, there are maintenance and support operations that are continuously occurring. For instance, polling for errors, instrumentation of events, communications to optimize configuration settings, recovery, data movement, workload redistribution, etc. Most often, these operations require an infrastructure for communication. However, they don't always require fast turn-around times or high bandwidth. However, there are other operations, like maintaining consistent time-of-day, where minimized latency is key. Since these operations often require the use of microcode for best programmability, operations can be retried in the case of failure. However, detecting errors in the system is important. Failure to execute some operation in the right sequence can cause data integrity errors. So, it is also important that the mechanism for data and control transfer has adequate RAS features (error detection and ability to retry operations).

Some of the prior art in this field had entirely serial structures. These structures allowed for large address spaces and large data fields. This is done with large serializers, so the data space comes with a cost in time. While optimized for wiring resources, these designs do not have the minimized latency needed for other operations, like time-of-day. Also, isolation of failures was difficult without some additional features.

Other prior art used address and control buses to do minimal maintenance operations. The problem with these systems is they did not have the ability to use a large maintenance address and data space. They also did not have much data protection on all operations.

One aspect of the invention is to use the existing data and control structure of the cache and dataflow in the system. This allows the advantage of high-RAS data and address protection. Another aspect is to separate operations into a fast queue and a slow queue. So, all the operations that need quick turn-around times (like time-of-day operations) do not get behind operations that can tolerate slow turn-around times and which often take longer.

Another aspect of the invention is to use parallel satellite controls for the fast queue while using cheaper, slow, serial satellite controls for the slow queue.

Both fast and slow queues make use of common building blocks. These building blocks are used in the data flow (where there is a converter from parallel, 64-bit data plus ECC to 16-bit sequenced data and conversion the other way as well).

Another aspect of the invention is how the fast engine and the slow engine use the same overall parallel sequence and components. They both handle conversion from/to ECC and parity in both directions. They also have address, controls, and data as well as packet checking and error reporting.

SUMMARY OF THE INVENTION

This invention provides a way for executing maintenance operations in a system. Controls, addresses, and data are sent from a requestor across the data bus and get buffered. Fast operations are separated from slow operations to help avoid hangs. Data is routed across narrower buses which allow conversion to Parity for ease of use. The operation is controlled by a state controller. Slow operations are serialized onto single-bit, daisy chains to minimize wiring resource. Faster operations use more parallelism to route address and data. For write operations, matching addresses cause the data to be written to the target. For read operations, matching addresses cause the data to be read from the target. The read data and/or status of the operation along with any errors are sent back to the state controller. The read data and/or status is then routed back to the dataflow where it is returned to the requester. Depending on the status, the operation is deemed successful or unsuccessful. Unsuccessful operations can be retried and recorded for possible recovery or attentions.

Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 illustrates one embodiment of the prior art.

FIG. 2 illustrates another embodiment of the prior art.

FIG. 3 illustrates separating fast and slow maintenance commands into separate engines or queues.

FIG. 4 illustrates an embodiment of the invention for fast operations.

FIG. 5 illustrates an embodiment of the invention for slow operations.

FIG. 6 illustrates a shifting data register which exists in the dataflow.

FIG. 7 illustrates an engine for fast operations.

FIG. 8 illustrates an engine for slow operations.

FIG. 9 illustrates a local engine that is used with the fast operations.

FIG. 10 illustrates an embodiment for converting ECC to Parity and Parity to ECC.

The detailed description explains the preferred embodiments of the invention, together with advantages and features, by way of example with reference to the drawings.

DETAILED DESCRIPTION OF THE INVENTION

Computer systems have grown to be very complex. In order to maintain high Reliability, Availability, and Serviceability (RAS), the computer itself is often doing maintenance operations. This includes handling interrupts, polling for errors, trapping and interpreting errors, reconfiguring hardware, etc. Because there are many maintenance registers with many bits across several chips, the maintenance hardware often uses an addressing scheme.

An example of an addressing scheme is to use read and write operations with node id, chip id, and on-chip address. There are also Write with mask (AND or OR) which is similar to bit-wise Set/Reset operations. This can be found in the prior art <SCOM Reference>.

Turning to FIG. 1, there is a prior art maintenance transport system, 101. This is the so-called Scan Communications (SCOM), which consists of a SCOM master, 102, and several SCOM satellites, 103. The SCOM master, 102, receives stimulus controls, address, and optional data on a common bus, 104, and starts a state machine to serially stream the data to the satellites, 103, via the SCOM loop drive bus, 105, through the daisy-chained SCOM loop, 106, and back through the SCOM loop receive bus, 107. In the preferred embodiment, there are separate address/status, data, and error indications on the SCOM loop, 106. If the serialized address matches a configured satellite address, that satellite will process the operation.

If the operation is a Read, the data from the register indicated by a portion of the address is returned serially on data portion of the SCOM loop, 106. For a write operation, the supplied data is written to the target register. Whether for a Read or a Write, the status from the operation is returned through the SCOM loop, 106, back to the SCOM master, 102. The status and/or return data are returned back to the requester via common bus, 104.

Turning to FIG. 2, there is a prior art maintenance transport system, which consists of control logic, 201, and data logic, 206. These historically were on separate chips in the system. The request command and address are sent on input control on control bus, 204. Because the computer input data bus is not used in these maintenance operations, the total of address, control, and data bits is limited to about 32 bits. The input control bus, 204, consists of a command (2 bits), address, 8 bits, and data, 20 bits, 2 spare. The UBUS master, 202, responds to the command on control bus, 204, and determines whether the target address is for the control logic, 201, or the data logic, 202.

If the command is targeted for the control logic, 201, the local control satellites, 203, are written to or read from directly. On a read, the 20-bit read data is sent through the UBUS master to the data logic UBUS slave, 207, using serial, 8-bit bus, 205. This data is then sent through data buffer, 209, and is forwarded to output data bus, 210.

If the command is targeted for the data logic, 206, the command and data is forwarded from the control bus, 204, through the UBUS master, 202, over the serial, 8-bit bus, 205, to the UBUS slave, 207, residing in the data logic, 206. The UBUS slave, 207, then the local data satellites, 208, are written to or read from directly. On a read, the 20-bit read data is sent through the UBUS slave, 207, through data buffer, 209, and is forwarded to the output data bus, 210.

In FIG. 3, there is a stream of maintenance operations that land in a common queue, 305. Some of these operations, for example Command A, 306, are fast. These are operations like Time-of-Day, which need to execute within a particular amount of time. Other operations, for instance Command C, 307, are deemed slow. These are operations that are allowed to take a long time and are often implemented using serial daisy chains. In the invention, the fast operations, like Command A, 306, are sent to fast engine, 302. Slow operations, like Command C, 307, are sent to slow engine, 301. The slow engine, 301, processes the slow commands using a serial, daisy chain of slow satellites, 303. The fast engine, 302, processes the fast commands using parallel, directly connected satellites, 304. Separating slow from fast operations is critical to maintaining low latencies in the system on critical operations while allowing for the versatility of serial operations for accessibility.

Turning to FIG. 4, there is shown the preferred embodiment for fast operations. In this case, unlike the prior art, the full use of the common command, 401, along with separate address, 405, and write data, 411, allows for faster overall operations and more robust checking that is typically seen in dataflow paths for high-end computers.

The requester, 423, supplies the command, 401. It also supplies the address, 405, and optional write data, 411. The address, 405, is sent across even data bus, 406, into even shifting data register, 407. At the same time, the optional write data, 411, is sent across odd data bus, 412, into odd shifting data register, 413. If the operation is a read, the write data is sent as all zeros with good ECC. The common command, 401, is decoded to produce a start pulse, 402, which activates the fast engine, 403.

The fast engine, 403, executes the following operation across both even and odd double-words:
1. Read even data register, 407, through even data byte bus, 408. This contains the address and detailed controls.
2. Read odd data register, 413, through odd data byte bus, 414. This contains the write data or mask for AND/OR.
3. Transfer the address, controls, and data to the local engine, 418, using the local engine access port, 417. The local engine, 418, is then kicked off:
   Broadcast command, address, and data to fast satellites, 420, using local broadcast bus, 419.
   Wait for returning data and status from fast satellites, 420, using individual read data/status buses, 421.
   Return read data/status and wake-up fast engine, 403, using return data/status/wake-up bus, 422.
4. Status is returned to even data register, 407, using even data byte bus, 409.
5. Data is returned to odd data register, 413, using odd data byte bus, 415.
6. Notify requester, 423, that the operation is done using the done signal, 404.

The requester, 423, then obtains final status using even data return bus, 410, and final data using odd data return bus, 416.

Turning to FIG. 5, there is shown the preferred embodiment for slow operations. In this case, also unlike the prior art, the full use of the common command, 501, along with separate address, 505, and optional write data, 511, allows for faster overall operations and more robust checking that is typically seen in dataflow paths for high-end computers.

The requester, 520, supplies the command, 501. It also supplies the address, 505, and optional write data, 411. The address, 505, is sent across even data bus, 506, into even shifting data register, 507. At the same time, the optional write data, 511, is sent across odd data bus, 512, into odd shifting data register, 513. The common command, 501, is decoded to produce a start pulse, 502, which activates the slow engine, 503.

The slow engine, 503, executes the following operation across both even and odd double-words:
1. Read even data register, 507, through even data byte bus, 508. This contains the address and detailed controls.
2. Read odd data register, 513, through odd data byte bus, 514. This contains the write data or mask for AND/OR.
3. Serialize the address, controls, and data onto the serial loop head, 517.
4. The serialize data then passes through each local serial satellite, 518, where the address is compared to a local address. If the local address matches, the address, data, and controls are used to perform a read, write, or masked write, as performed in the prior art for serial communications. If data is to be returned, it is merged into the existing serial communications loop, 521, where it is eventually returned on the serial loop tail, 519. Likewise, status, including error information, is merged into the existing serial communications loop, 521, where it is eventually returned on the serial loop tail, 519.

5. Status is returned to even data register, 507, using even data byte bus, 509.
6. Data is returned to odd data register, 513, using odd data byte bus, 515.
7. Notify requestor, 520, that the operation is done using the done signal, 504, and reset.

The requestor, 520, then obtains final status using even data return bus, 510, and final data using odd data return bus, 516.

FIG. 6 depicts an implementation of a shifting data register. This structure can be used for the even and odd data registers, identified as 407 and 413, in FIG. 4 and 507 and 513 in FIG. 5. The shifting data register, 607, consists of a data register, 601, which is controlled by local sequencing logic, 604. Data can be loaded from input parallel bus, 606, or unloaded onto output parallel bus, 610. It can also be loaded from input byte bus, 609, one byte at a time, using input byte select logic, 603. It can be unloaded onto output byte bus, 608, using output byte mux, 602. ECC is considered part of the data register and can be either loaded or unloaded either in parallel or by byte along with the data. The input and output byte buses can be designed to be any desired width. The preferred embodiment uses 8 bits.

Turning to FIG. 7 is shown the details of the fast engine, 403. The start pulse, 402, wakes up the fast engine sequencer, 704, to perform the following operations:

1. Shift in even byte bus, 408, into address/status register, 701, using input byte select logic, 702. Shown is a simple parity example. ECC/PTY conversion is described later in association with FIG. 10.
2. Shift in odd byte bus, 414, into data register, 701', using input byte select logic, 702'. This can occur after step 1, before step 1, or simultaneously.
3. Broadcast the address and data, according to protocol, onto local engine access port, 417. Please note that while the preferred embodiment shows a local engine, 418, in FIG. 4, the protocol could support direct connections to the local satellites, 420, also in FIG. 4. This broadcast is accomplished by merging the address with the data, using local broadcast mux, 707. The address from address/status register, 701, is selected using address output mux, 706. The data from data register, 701', is selected using data output mux, 706'.
4. When the resulting status and/or read data is received on the local data/status/wake-up bus, 422, the sequencer, 704, processes the status and data.
5. Status is placed into the address/status register, 701, using status select logic, 705.
6. Data is placed into the data register, 701' using data select logic, 705'.
7. Status is returned onto the even data byte bus, 409, using output byte mux, 703.
8. Data is returned onto the odd data byte bus, 415, using output byte mux, 703'.
9. The sequencer, 704, then asserts the done signal, 404, and resets.

Turning to FIG. 8 is shown the details of the slow engine, 503. The start pulse, 502, wakes up the slow engine sequencer, 804, to perform the following operations:

1. Shift in even byte bus, 508, into address/status register, 801, using input byte select logic, 802. Shown is a simple parity example. ECC/PTY conversion is described later in association with FIG. 10.
2. Shift in odd byte bus, 514, into data register, 801', using input byte select logic, 802'. This can occur after step 1, before step 1, or simultaneously.
3. Serial shift out the address from the address/status register, 801, onto address serial loop head, 517.
4. Serial shift out the optional write data from the data register, 801', onto data serial loop head, 517'.
5. When the serial operation (read, write, or masked write) completes, the status will arrive on address serial loop tail, 519. The sequencer, 804, will shift the status into the address/status register, 801.
6. Serial shift data, arriving on data serial loop tail, 519', into data register, 801'.
7. Status is returned onto the even data byte bus, 509, using output byte mux, 803.
8. Data is returned onto the odd data byte bus, 515, using output byte mux, 803'.
9. The sequencer, 804, then asserts the done signal, 504, and resets.

Turning to FIG. 9 is shown a local engine. The local engine, 418, is comprised of local address/data/status register, 901, which is loaded from local engine access port, 417, using input access port select logic, 902. The address and data are then broadcast onto local broadcast bus, 419. When the local fast satellites, 420, shown in FIG. 4, complete the requested read, write, or write with mask operation, the data and status are returned using individual read data/status buses, 421 (shown as 421*a*, 421*b*, 421*c*). The data/status return mux, 905, selects the appropriate data and status and writes it to address/data/status register, 901. The status and data are then returned on the local return data/status/wake-up bus, 422.

The preferred embodiment makes use of both ECC and parity. ECC is robust and is used throughout the parallel data paths that are used commonly between mainline, system paths and the pervasive operations. Once the fast and slow engines are loaded, it is more convenient to use parity. The robustness of ECC is not needed, and the simplicity and efficiency of parity is desired.

Within each engine, the ECC that is serialized across the byte buses is converted into parity. When data is returned, the parity is converted back to ECC. However, there is also checking to make sure the buses are protected properly. This is done as part of the conversion.

Turning to FIG. 10, there is a sequencer, 963, that controls the various muxes in the engine. This logic applies equally to both the fast engine, 403, and the slow engine, 503. The byte data with ECC, 950, is selected using input mux, 952, onto input select bus, 953, which is sent on output data bus, 964, without correction. Parity is generated from the input select bus, 953, using parity generation logic, 954. The parity is selected, using output protection mux, 956, and enters the poison logic, 961. Meanwhile, ECC checkbits are generated using ECC checkbit generation logic, 955, from the input select bus, 953, and is steered using output compare mux, 957, to enter the compare circuit, 959. The original ECC is extracted from the select bus, 953, and also enters the compare circuit, 959.

The compare circuit, 959, compares the originally sent ECC with the newly generated ECC from the input data. If they compare, it indicates that the data and ECC were correctly transmitted to the engine. In this case, the poison logic simply repowers the generated parity to the parity/ecc output bus, 962. So, the parity on the data should be correct.

If the generated ECC does not match the transmitted ECC, the compare circuit, 959, indicates an error on the miscompare status signal, 960, which forces the poison logic, 961, to flip the newly generated parity. This will cause a downstream parity error which will ensure that the operation is aborted. The miscompare signal, 960, can also be used to abort the operation immediately, as in the preferred embodiment, and the 'bad ecc' status can be specifically reported to help with error isolation. This causes the entire operation to be retried.

The conversion can also go from parity to ECC. The data with ECC, 951, is selected using input mux, 952, onto input select bus, 953, which is sent on output data bus, 964, without correction. ECC checkbits are generated from the input select bus, 953, using ECC checkbit generation logic, 955. The checkbits are selected, using output protection mux, 956, and enters the poison logic, 961. Meanwhile, parity is generated using parity generation logic, 954, from the input select bus, 953, and is steered using output compare mux, 957, to enter the compare circuit, 959. The original parity, 958, is extracted from the select bus, 953, and also enters the compare circuit, 959.

The compare circuit, 959, compares the originally sent parity with the newly generated parity from the input data. If they compare, it indicates that the data and parity were correctly transmitted to the engine. In this case, the poison logic simply repowers the generated checkbits to the parity/ecc output bus, 962. So, the checkbits on the data should be correct.

If the generated parity does not match the transmitted parity, the compare circuit, 959, indicates an error on the miscompare status signal, 960, which forces the poison logic, 961, to flip particular bits of the newly generated checkbits, to cause a special UE. Poisoning data with special ECC patterns is known in the art. This will cause a downstream ECC error which will ensure that the operation is aborted. The miscompare signal, 960, can also be used to abort the operation immediately, as in the preferred embodiment, and the 'bad parity' status can be specifically reported to help with error isolation. This causes the entire operation to be retried.

For an example of errors that can be reported as status, please turn to TABLE 1. Here are shown some typical status bits and the errors they represent. Using different bits for various detected errors helps to isolate the exact problem associated with the failing operation.

TABLE 1

Typical error status for fast and slow operations

| Bit | Fast Operation Status | Slow Operation Status |
|---|---|---|
| 0 | Collision - engine already active | Collision - engine already active |
| 1 | Bad ECC for input Address | Bad ECC for input Address |
| 2 | Bad ECC for input Data | Bad ECC for input Data |
| 3 | Collision, unexpected return data | Collision, unexpected return data |
| 4 | Hang, timeout waiting for parallel operation | Hang, timeout waiting for serial operation |
| 5 | Bad parity on returned status | Bad parity on returned status |
| 6 | Bad parity on returned data | Bad parity on returned data |
| 7 | Abort due to other reason | Abort due to other reason |
| 8 | Time-of-day source error | Serial engine problem |
| 9 | External time reference error | <unused> |
| 10 | Engine-detected error | Engine-detected error |
| 11 | <unused> | <unused> |
| 12-63 | <unused> | <unused> |

TABLE 2 shows a comparison of Address and Data paths for both slow and fast operations. Notice how similar the processes are to implement both the fast and slow. The only differences are the byte bus for fast operations vs. serial bitstream for the slow operations as well as the detailed implementation of the slow and fast operations. These similarities in the processes allow for common design components for state machines and other operational logic.

The address and data paths are identical. The only difference is when the address and data finally arrive at the satellite, they are obviously treated differently. This symmetry of address and data allows for common design components for shifters, ECC, parity, controllers, etc.

TABLE 2

Comparison of Addr/Data and Fast/Slow

| | Addr/EDW | Data/ODW |
|---|---|---|
| Slow | Shift in by 8 (address) | Shift in by 8 (write data) |
| | Shift out by 1 (address) | Shift out by 1 (write data) |
| | SCOM Wait | SCOM Wait |
| | Shift in by 1 (status) | Shift in by 1 (read data) |
| | Shift out by 8 (status) | Shift out by 8 (read data) |
| Fast | Shift in by 8 (address) | Shift in by 8 (write data) |
| | Shift out by 8 (address) | Shift out by 8 (write data) |
| | SCOM Wait | SCOM Wait |
| | Shift in by 8 (status) | Shift in by 8 (read data) |
| | Shift out by 8 (status) | Shift out by 8 (read data) |

TABLE 3 shows a comparison of read and write processes for both fast and slow operations. Notice how similar the read and write paths are. The only difference between read and write is that a Read is sent ZERO data and the Write echos the write data back, rather than reading new data. Although the hardware could actually read the physical result of a write and return that data. This would be appropriate for cases where a write mask were applied.

TABLE 3

Comparison of Read and Write for Fast and Slow operations

| | FAST | SLOW |
|---|---|---|
| Read | Address on EDW | Address on EDW |
| | ZERO on ODW | ZERO on ODW |
| | Kick-off fast | Kick-off slow |
| | Status on EDW | Status on EDW |
| | Read data on ODW | Read data on ODW |
| Write | Address on EDW | Address on EDW |
| | Write Data on ODW | Write Data on ODW |
| | Kick-off fast | Kick-off slow |
| | Status on EDW | Status on EDW |
| | Write data on ODW | Write data on ODW |

Applying these concepts, the preferred embodiment incorporates the aspects of this patent, into a dual-pipe (one pipe for fast ops, one pipe for slow ops), dual-dataflow (one doubleword for address/controls/status and the other doubleword for data), robust (with ECC and parity protection with conversion), pervasive infrastructure which allows communication and controls with up to 64-bit read and write data, up to 64-bit address and controls and up to 64-bit status, including isolation of errors to diagnose where the errors occurred.

While the preferred embodiment to the invention has been described, it will be understood that those skilled in the art, both now and in the future, may make various improvements and enhancements which fall within the scope of the claims which follow. For instance, CRC could be applied to the data transfers instead of the parity/ecc conversion/compare. Also, other local implementations of local data manipulation can be incorporated into the invention. Replacements applied as additional features and advantages are realized through the techniques of the present invention.

These claims should be construed to maintain the proper protection for the invention first described.

What is claimed is:

1. A method of performing data operations in a computer comprising:
   receiving in a common queue a stream of data operations, the data operations include control commands, address, and data;
   identifying fast commands, which are required to execute within a particular amount of time;
   identifying slow commands, which are allowed a longer time for execution than fast commands;
   separating fast commands from slow commands by sending
      the fast commands to a fast engine for processing fast operations using a parallel connected satellite, and
      the slow commands to a slow engine for processing slow operations using a serial chain.

2. The method according to claim 1, where fast commands include parallel time-of-day (TOD) operations.

3. A method of performing data operations comprising:
   receiving in a common queue a stream of data operations, the data operations include control commands, address information, and data information;
   loading the address information into a data word,
   loading the data information into another dataword,
   starting a routing process to separate fast commands from slow commands by sending
      the fast commands to a fast engine for processing fast operations using a parallel connected satellite, and
      the slow commands to a slow engine for processing slow operations using a serial chain; and
   performing a read or a write operation using the address and data provided.

4. The method according to claim 3, where status is returned.

5. The method according to claim 4 which includes the additional steps of:
   detecting an error, and
   indicating such error on a particular bit of the status.

6. The method according to claim 5 which includes the additional step of:
   aborting the operation in the presence of an error, and retrying the operation again.

7. The method according to claim 3, where data is returned.

8. The method according to claim 3 where the performing a read or a write operation is accomplished using a parallel, broadcast/mux configuration of satellites.

9. The method according to claim 3 where the performing a read or a write operation is accomplished using a serial loop of satellites.

10. The method according to claim 3 where the performing a read or a write operation includes a masked write operation to set only specific bits.

11. The method according to claim 3 where the performing a read or a write operation includes a masked write operation to reset only specific bits.

12. The method according to claim 3, wherein the fast commands being processed by the fast engine includes transferring the address information and the data information to a local engine.

13. The method according to claim 3, further comprising using only parity in response to sending at least one of the fast commands to the fast engine, and the slow commands to the slow engine.

14. A computer having maintenance operations, comprising control commands, address and data storage and transfer logic, and having a common queue for a stream of maintenance operations, some of said commands being commands for fast operations which need to execute within a particular amount of time, and other commands for slow operations which are allowed a different and longer time for execution, a fast engine for processing fast operations using a parallel connected satellite and a slow engine for processing slow operations using a serial chain, and differentiators for separating slow from fast operations in the system on critical operations while allowing for the versatility of serial operations for accessibility.

15. The computer according to claim 14 wherein said parallel and serial operations co-exist without the parallel operations being slowed down by the serial operations implemented for accessibility.

16. The computer according to claim 14 wherein is provided a plurality of engines for fast and slow operations.

17. The computer according to claim 16 wherein said engines utilize a common shifter for said maintenance operations.

18. The computer according to claim 17 further having ECC to parity and parity to ECC converters.

19. The computer according to claim 18 further having error detection and isolation storage, both locally and in a reported operation status location.

20. The computer according to claim 19 wherein the operations are processing in a dual pipe, dual dataflow which allows communication and controls for doublewords with accommodating maintenance address and data spaces.

* * * * *